United States Patent [19]

Frenzel

[11] Patent Number: 5,441,183

[45] Date of Patent: Aug. 15, 1995

[54] VEHICULAR COMPARTMENTALIZER UNIT

[76] Inventor: Michael J. Frenzel, 7134 Richards Dr., Baton Rouge, La. 70809

[21] Appl. No.: 220,209

[22] Filed: Mar. 30, 1994

[51] Int. Cl.⁶ .............................................. B62D 33/04
[52] U.S. Cl. .................... 224/542; 296/37.1
[58] Field of Search .................... 224/42.42; 296/37.1, 296/37.6, 37.16

[56] References Cited

U.S. PATENT DOCUMENTS

| 2,867,471 | 1/1959 | Coon, Jr. ...................... 224/42.42 X |
| 2,889,097 | 6/1959 | Broehl ............................... 224/42.42 |
| 3,181,911 | 5/1965 | Peras ................................... 296/37.1 |
| 3,291,520 | 12/1966 | Smith . |
| 4,733,898 | 3/1988 | Williams ........................... 224/42.42 |
| 5,056,846 | 10/1991 | Tanaka ................................ 296/37.1 |
| 5,083,827 | 1/1992 | Hollenbaugh, Sr. ............... 296/37.1 |

FOREIGN PATENT DOCUMENTS 61-263841  11/1986  Japan .

OTHER PUBLICATIONS

Abstract (in English) of German Offenlegugsschrift DE 31 06 116 A1 plus 9–page copy of original document (in German) including Figures 1 and 2; original document published Dec. 1982.
Abstract (in English) of Japan 61–249,850 plus 6–page copy of original document (in Japanese) including Figures 1 through 9; original document published Nov. 1986.
Abstract (in English) of Japan 61–257,338 plus 7–pages copy of original document (in Japanese) including Figures 1 through 10; original document published Nov. 1986.

Primary Examiner—Renee S. Luebke
Attorney, Agent, or Firm—John F. Sieberth

[57] ABSTRACT

The unit is a free-standing unit that can be easily installed in and easily removed from an automotive utility vehicle. The unit comprises (i) a platform which includes a hinged trap door and (ii) an underlying supportive wall. The unit is configured and sized so that when installed in the cargo-receiving area of the vehicle: (a) the unit preferably has a low profile; (b) the platform and closed trap door closely conform to the perimeter of the cargo-receiving area; (c) the unit defines a plurality of storage compartments beneath the platform; and (d) the trap door provides access to one or more of these storage compartments. In one form the platform and trap door both have a camouflaged top surface and the unit has a low profile so that its presence in the vehicle is concealed. In another form the edges of the platform abut or closely confront the interior walls and back door or tailgate and back of the seat that define the perimeter of the cargo-receiving area. Where these walls, tailgate and seat back are sloped inwardly, the unit is secured in place without need for attachment to the vehicle.

20 Claims, 13 Drawing Sheets

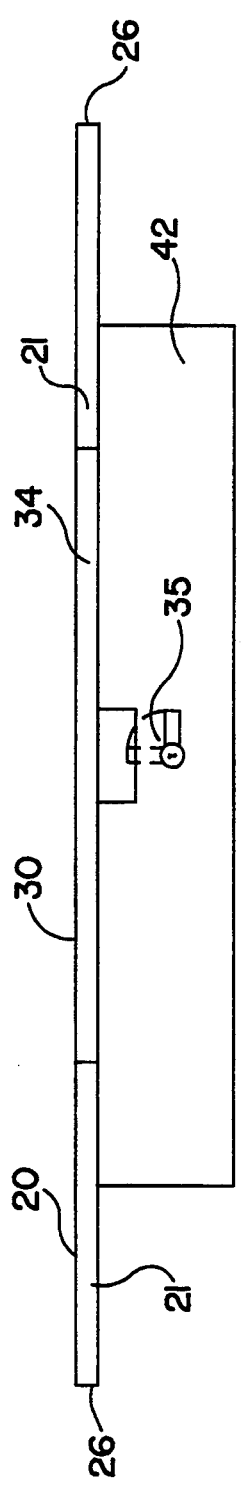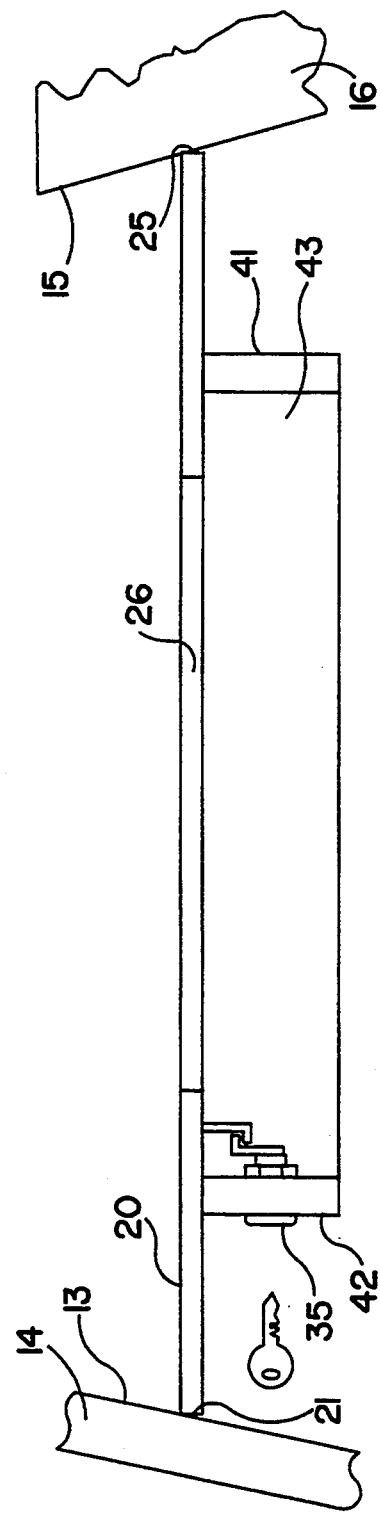

VEHICULAR COMPARTMENTALIZER UNIT

This invention relates to a free-standing storage/concealment unit adapted for easy installation in and easy removal from automotive vehicles having interior cargo-receiving areas accessible by a door or tailgate, such as station wagons, vans, mini-vans, sports utility vehicles, and the like.

Many station wagons, vans, mini-vans and like utility vehicles possess flat cargo-receiving areas in their interiors behind the passenger seats. Access is gained to these areas by various closures at the back of the vehicle, such as doors that are hinged at the top or at one side, or closures involving a combination of a hinged upper door and a tailgate. Articles carried in these cargo-receiving areas are normally visible through one or more the windows in the vehicle, and thus tend to invite theft. Accordingly, some vehicles such as station wagons are equipped with a retractable horizontal shade which when unrolled and fastened in place can be used to cover such articles. However when used in this manner these shades are easily identifiable by looking through the window, and thus invite attention to the fact that articles may be located under them. Upon forced entry as by the smashing of a window or the unlocking of a front door of the vehicle, the shade is easily disposed of and thus affords no protection against rapid removal of items located in the cargo-receiving area.

Some utility vehicles do not even provide convenient storage space for such common items as jumper cables, tow strap, tire chains, first aid kit, road flares, and so forth. Instead, these items are normally placed under the back bench seat of the vehicle which is not enclosed. Thus these articles can interfere with the fold-down capability of the seat, and moreover are free to slide out from under the seat to create an unsightly appearance and potentially unsafe condition in the vehicle.

Prior efforts to provide more secure cargo storage areas in the vehicle have involved proposals to provide built-in storage compartments or alternatively, to provide various containers which are fastened in place by means of special brackets or other types of attachment mechanisms. Built-in storage compartments necessitate changes in the design and construction of the vehicle and thus not only add to the costs of the vehicle, but are of no assistance to owners of vehicles not equipped with such compartments. Prior approaches which involve installation of special brackets or other means of fastening a storage compartment to the vehicle not only require custom installation, but involve permanent alterations in the vehicle such as the drilling of holes in its interior to accommodate bolts, screws or other like fasteners to secure the brackets or the like in place.

It is therefore an object of this invention to provide a unit that can be readily and securely installed in the vehicle without need for special customized attachments.

Another object is to provide a unit which once installed in the vehicle can be easily removed therefrom, if desired, when the back door and/or tailgate is opened to provide access to the cargo-receiving area.

A further object is to provide a unit which can be constructed so as to camouflage its existence in the vehicle.

A still further object is to provide a unit which provides a convenient and safe storage space for such items as jumper cables, tow strap, tire chains, first aid kit, road flares and the like.

Yet another object is to provide a unit having a number of still further advantages in addition to those referred to above.

Pursuant to this invention the foregoing objects are achieved by providing a free-standing compartmentalizer unit adapted for easy installation in and easy removal from an automotive vehicle that has a generally flat cargo-receiving area, the perimeter of which is defined by (i) spaced-apart interior vehicular side walls, (ii) an interior vehicular wall of a back door or tailgate and (iii) the rear side of the back rest of a seat construction disposed in the vehicle in front of the cargo-receiving area, and wherein the walls of (i) or the walls of (ii) and (iii) or, most preferably the walls of (i), (ii) and (iii) are sloped upwardly and inwardly relative to the cargo-receiving area. The compartmentalizer unit is characterized by a number of interrelated features of construction which give rise to the many advantages which it possesses:

A) The unit comprises (1) a platform (2) a hinged lid or trap door; and (3) a supportive wall portion.

B) The platform has (1) an upper surface, (2) a forward edge portion, (3) a pair of spaced-apart outside edge portions, (4) a pair of laterally spaced-apart rearward edge portions, and (5) a cutaway space extending forwardly between the spaced-apart rearward edge portions and terminating at an interiorly-disposed transverse back edge.

C) The cutaway space in the platform is defined by a pair of forwardly-extending inside edges of the platform and the interiorly-disposed transverse back edge of the platform.

D) The lid has (1) a front edge, (2) a back edge, (3) a pair of spaced-apart side edges, (4) a bottom surface, and (5) a top surface.

E) The lid is sized and shaped to fit within and substantially fill the cutaway space, and is hinged to the platform either (1) between or along the front edge of the lid and the interiorly-disposed transverse back edge of the platform or (2) between or along one of the side edges of the lid and the one of the forwardly-extending inside edges of the platform that is proximate thereto, so that in either case the lid can be raised to an open position by pivotal movement upwardly from, and can be lowered to a closed position by pivotal movement downwardly to, a co-planar position wherein the top surface of the lid is in the same flat plane as the upper surface of the platform.

F) The pair of laterally spaced-apart rearward edge portions of the platform and the back edge of the lid form a substantially continuous back edge portion when the lid is disposed in the foregoing co-planar position.

G) The foregoing wall portion is sized, shaped and adapted to support the platform a predetermined distance above the cargo area and provide therein a plurality of storage compartments when the compartmentalizer unit is installed in the vehicle with the wall portion below the platform.

H) The platform and lid are shaped and sized such that when the platform is supported at the predetermined distance above the cargo area floor with the lid disposed in the co-planar position, (1) one of the spaced-apart side edge portions of the platform closely confronts and generally conforms to one of the spaced-apart interior vehicular side walls and the other of the spaced-apart side edge portions of the platform closely confronts and generally conforms to the other of the spaced-apart interior vehicular side walls, (2) the forward edge portion of the platform closely confronts and generally conforms to the rear side of the seat construction, and (3) the continuous back edge portion closely confronts and generally conforms to the interior vehicular tailgate wall whereby the compartmentalizer unit is removably secured in position without requiring attachment to the vehicle.

Preferably, the platform and lid are shaped and sized such that when the platform is supported at the predetermined distance above the cargo area floor with the lid disposed in the co-planar position, (1) one of the spaced-apart side edge portions of the platform abuts and generally conforms to one of the spaced-apart interior vehicular side walls and the other of the spaced-apart side edge portions of the platform abuts and generally conforms to the other of the spaced-apart interior vehicular side walls, (2) the forward edge portion of the platform abuts and generally conforms to the rear side of the seat construction, and (3) the continuous back edge portion abuts and generally conforms to the interior vehicular tailgate wall.

It will be understood that terms identifying locations such as "upper", "lower", "forward", "rearward", "front", "back", "side", "top", "inside", "outside", "upward", "downward", etc., in whatever grammatical form used, refer to directions or locations with respect to the vehicle and/or unit when properly installed in the vehicle with the lid in closed position. Thus, for example, the back door of the vehicle is located at the back or trailing end of the vehicle rather than being a "rear" door of a four-door vehicle, which of course is located on the side of the vehicle. Also hereinafter the term "unit" always refers to a compartmentalizer unit of this invention.

In another of its embodiments, this invention provides a free-standing compartmentalizer unit adapted for easy installation in and easy removal from an automotive vehicle that has a generally flat cargo-receiving area, where the unit comprises (i) a platform including a hinged trap door portion and (ii) an underlying supportive wall portion. The platform and hinged trap door portion both have a camouflaged top surface, and the unit is configured and sized such that when installed within the vehicle: (a) the unit has a low profile; (b) the platform and closed trap door substantially conform to the perimeter of the cargo-receiving area and provide a substantially continuous flat camouflaged top surface over substantially the entire cargo-receiving area; (c) the unit defines a plurality of storage compartments beneath the platform; and (d) the trap door provides access to at least one, and preferably a plurality, of these storage compartments.

Referring to the Drawings in which like numerals represent like parts among the various Figures:

FIG. 7 is a back elevation of a unit with the lid thereof in closed position.

FIG. 8 is a side elevation of a unit with the lid thereof in closed position.

in FIG. 15A the hinge is mounted between the adjacent edges whereas in FIG. 15B the hinge is mounted along the adjacent edges.

Figure 5:
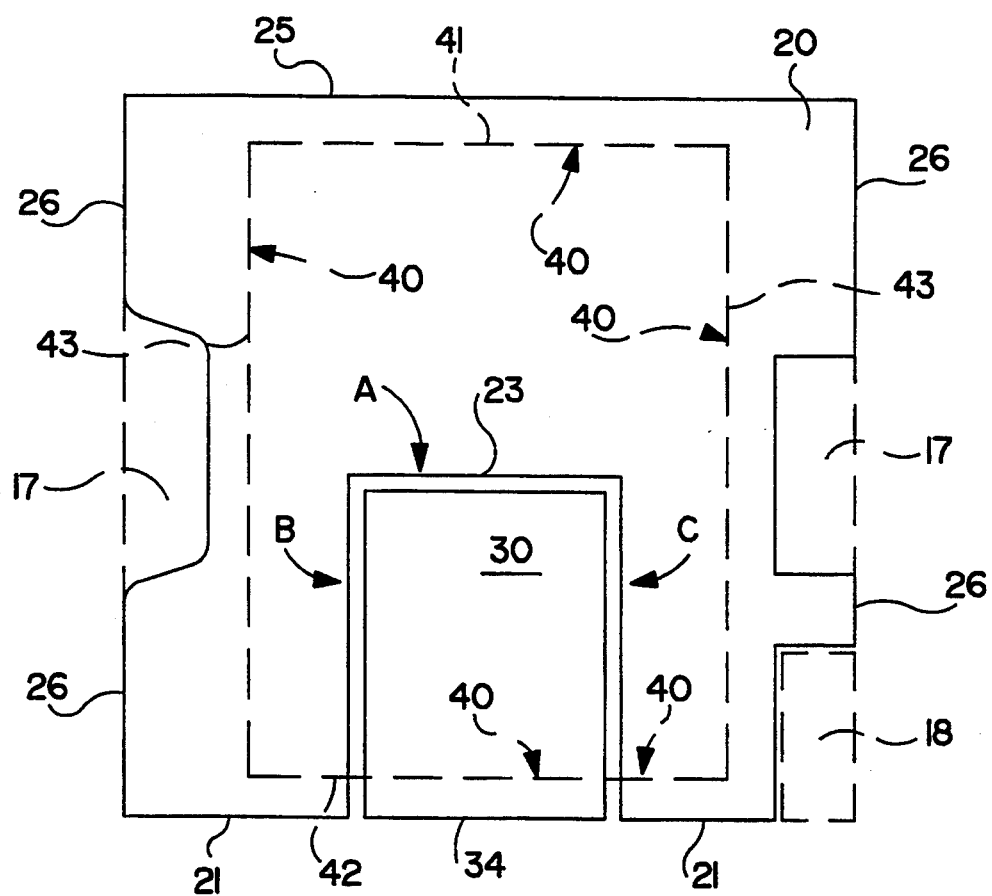
FIG. 5 is a plan view partly in phantom of a unit in which the platform is configured for use in a vehicle in which upper portions of rear wheel wells and an interior spare tire well are located at the perimeter of the cargo-receiving area.

Referring to the Drawings, vehicle 10 as depicted is a station wagon type vehicle with a generally flat cargo-receiving area 12. The perimeter of area 12 is defined on each side by an interior vehicular side wall 11, an interior vehicular wall 13 of a back door or tailgate 14 (when closed), and the rear side 15 of the back rest of a seat construction 16 disposed in the vehicle in front of the cargo-receiving area. Either (i) the side walls 11,11 or (ii) back wall 13 and the rear side 15 of the back rest of the seat construction 16 are sloped upwardly and inwardly relative to cargo-receiving area 12. Preferably, walls 11,11, wall 13 and rear side 15 are all sloped upwardly and inwardly relative to area 12. FIG. 5 illustrates a vehicle in which protruding upper portions of wells 17,17 for the rear wheels and an interior well and spare tire 18 are located at the perimeter of cargo-receiving area 12.

Figure 4:
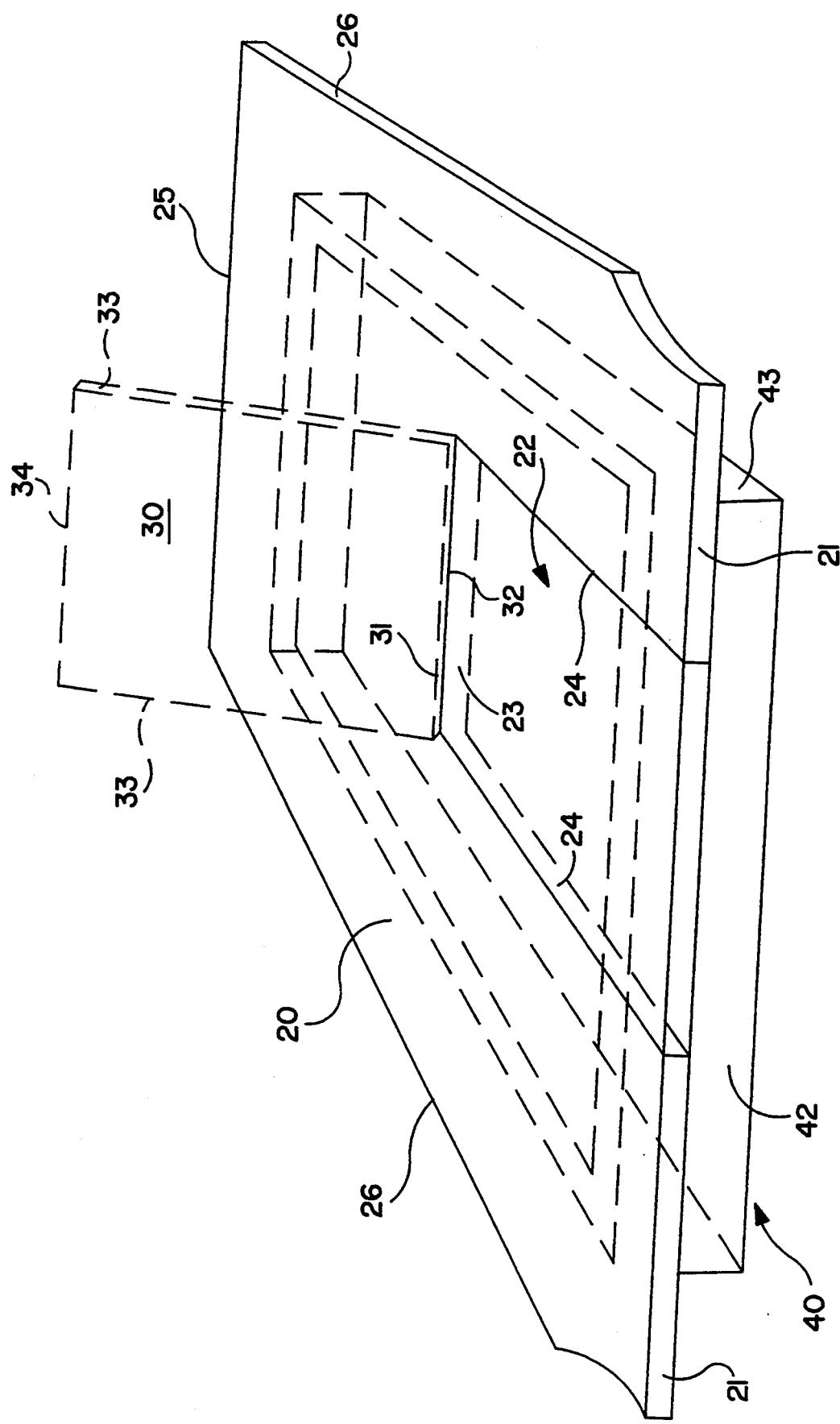
FIG. 4 is a view in perspective and partly in phantom of a unit with the lid thereof in open position.
Figure 15A:
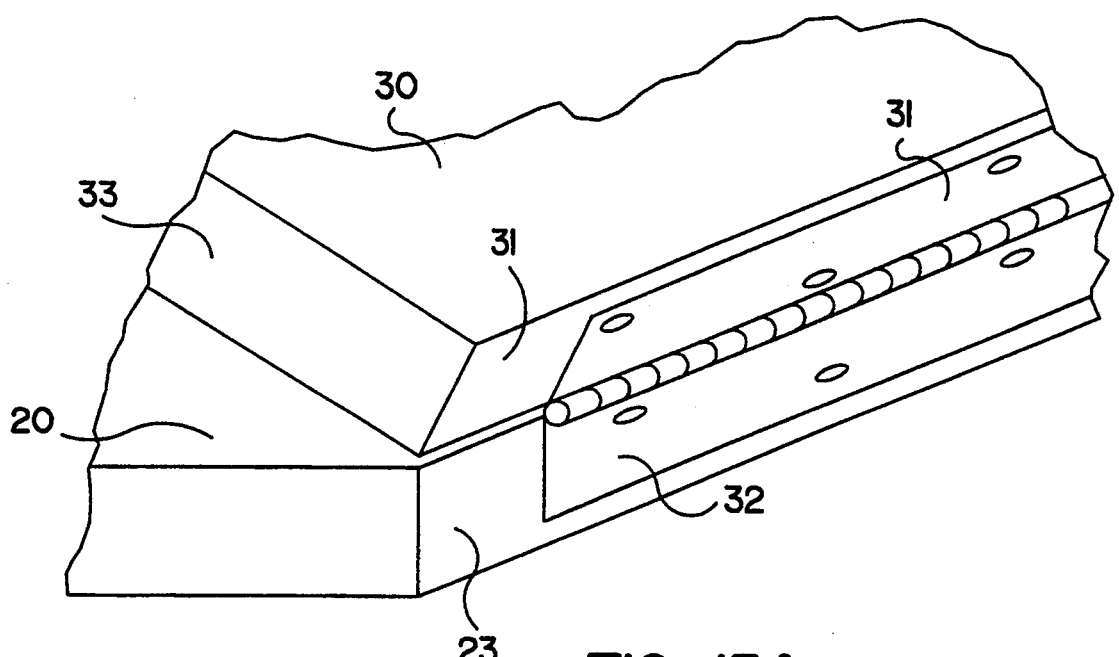
FIGS. 15A and 15B illustrate in fragmentary perspective two ways of hinging the lid or trap door to the platform.
Figure 15B:
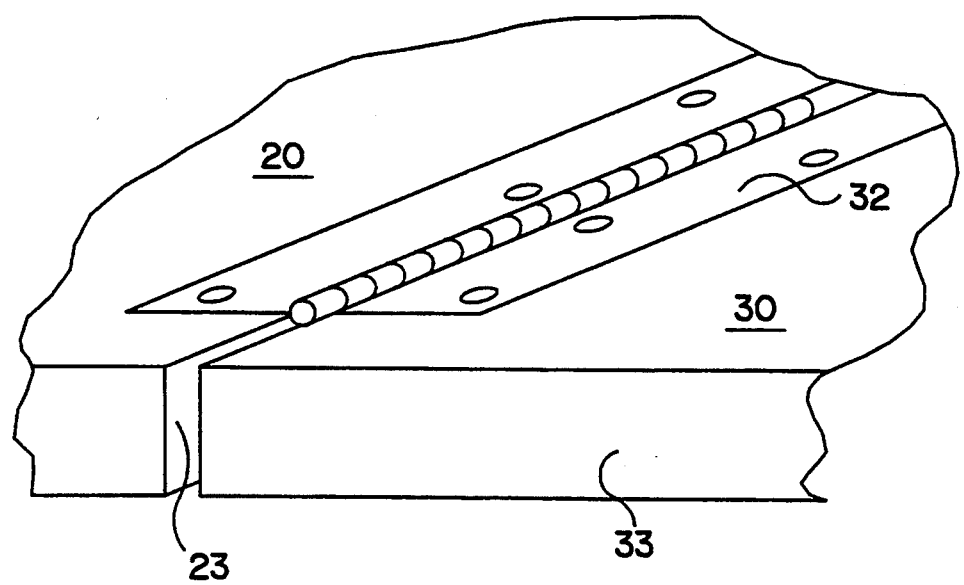

In the form illustrated in the Drawings, the unit of this invention comprises platform 20, hinged lid or trap door 30 and wall portion 40. Lid 30 is sized and shaped to fit into cutaway space 22 so that when the lid is closed, the top of platform 20 and lid 30 are co-planar so that an essentially flat top surface exists over the floor of the cargo-receiving area 12. Cutaway space 22 extends forwardly between spaced-apart rearward edge portions 21,21 of platform 20 and terminates at an interiorly-disposed transverse back edge 23. The sides of cutaway space 22 are defined by inside (i.e., interior side) edges 24,24. Lid 30 is hinged to platform 20 by means of a hinge 32, which can be a single extended hinge such as a piano hinge (as depicted) or two or more suitably aligned separate hinges. Lid 30 can be hinged to the platform by disposing and connecting hinge 32 between (note FIG. 15A) or along (note FIG. 15B) transverse back edge 23 of platform 20 and the front edge 31 of lid 30 (as depicted) or the hinge can be disposed and connected between or along either interior side edge 24 of platform 20 and one of the two side edges 33,33 of lid 30 that is adjacent to the selected side edge 24 of the platform. Thus the hinging may be effected at any one of loci A, B or C (note FIG. 5). Preferably, the hinging is effected at locus A as depicted for example in FIG. 4, as this arrangement enables more effective positioning of locking means such as lock or latch mechanism 35 described hereinafter. The back edge 34 of the lid when in closed position is co-terminal with and disposed between rearward edge portions 21,21.

Platform 20 (together with lid 30) is sized and shaped to fit into the cargo-receiving area 12 of the vehicle. The outer limits of the platform and lid (when the lid is in closed position) are defined by a forward edge portion 25 of the platform, a pair of spaced-apart outside edge portions 26,26 of the platform, the spaced-apart edge portions 21,21 of the platform, and the back edge 34 of the lid.

Wall portion 40 is attached to the underside of platform 20, and is configured and disposed to support the platform at a predetermined elevation above the floor of the cargo-receiving area 12. In the preferred form depicted, the wall portion is composed of four wall segments: a front wall segment 41, a back wall segment 42, and a pair of side wall segments 43,43, and these are disposed so they form a rectangular storage enclosure 44 beneath the platform. It is possible, though less preferred, to utilize only two spaced-apart linear wall segments which can extend either longitudinally or transversely relative to the vehicle, for example, by employing either lengthened segments 43,43 (spaced-apart longitudinally disposed segments), or lengthened segments 41 and 42 (spaced-apart transversely disposed segments). In either such case a storage area is provided beneath the platform. It is also possible, although again less preferred, to alter the shape of the enclosure by providing, for example, a wall portion configured as a circle, a semi-circle, an oval, a hexagon, or the like. Whatever its configuration, at least the storage enclosure defined by wall portion 40 beneath the platform is located so as to be accessible when lid 30 is raised to an open position.

Figure 12:
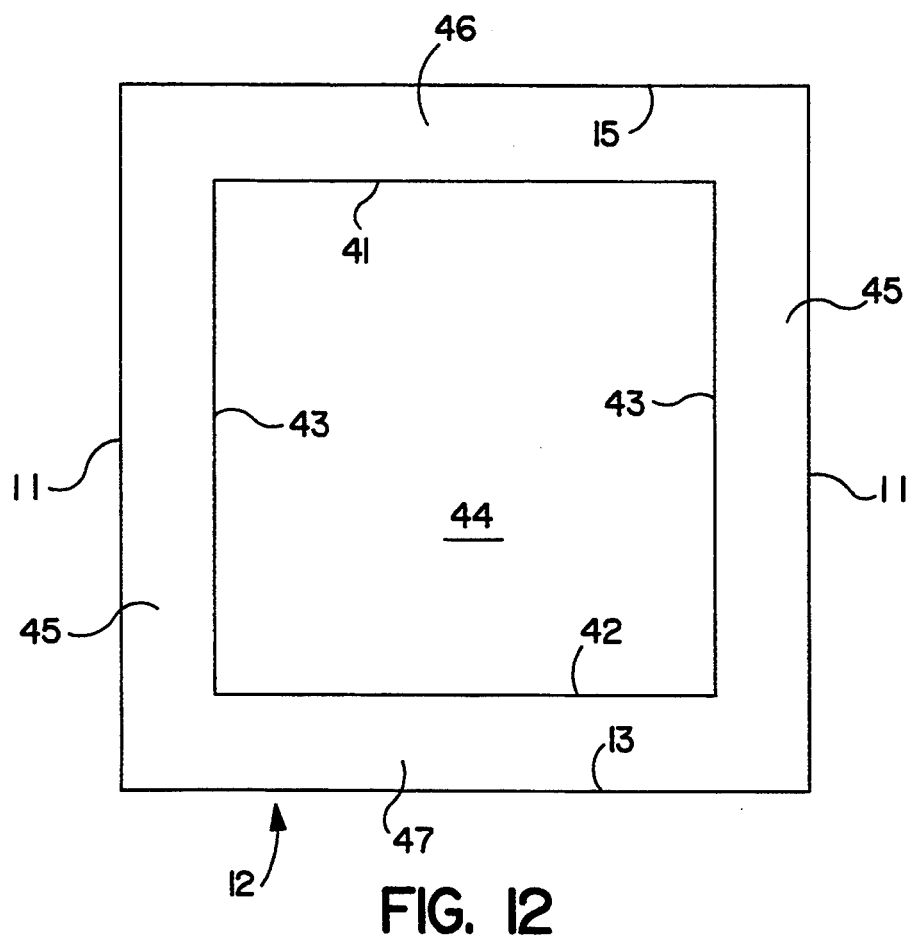
FIG. 12 is a schematic plan view of the storage compartments formed by installation of a preferred form of the unit in a vehicle.

Preferably the outer limits of wall portion 40 are retracted or set back from the outer limits of the platform and closed lid. This enables the creation of a plurality of storage compartments when the unit is installed in the vehicle. For example, wall portion 40 in its most preferred form and configuration not only involves use of the four wall segments (front wall segment 41, back wall segment 42, and side wall segments 43,43), but as indicated in the Drawings these segments are all retracted or set back from the outer limits of platform 20 and lid 30. As best illustrated in FIG. 12, the unit in this form provides five storage compartments under the platform: rectangular enclosure 44 within the confines of the four wall segments; two elongated side compartments 45,45 extending longitudinally between the respective wall segments 43 and the vehicular side wall 11 proximate thereto; a front compartment 46 extending transversely between wall segment 41 and the rear side 15 of the back rest of seat construction 16; and a rear compartment 47 extending transversely between wall segment 42 and wall 13 of the back door or tailgate 14.

It can thus be seen that wall portion 40 supports the platform and lid a predetermined height above the floor of the cargo-receiving area 12 of the vehicle and at the same time defines the number and location of the storage compartments beneath the platform. Moreover, when platform 20 is installed in the vehicle and when lid 30 is in closed position, forward edge portion 25 of the platform closely confronts, and preferably abuts, the rear side 15 of the back rest of a seat construction 16; each outside edge portion 26 of the platform closely confronts, and preferably abuts, the adjacent vehicle side wall 11; and the spaced-apart edge portions 21,21 of the platform together with back edge 34 of lid 30 closely confront, and preferably abut, the interior vehicular wall 13 when the tailgate or back door 14 is likewise in closed position. Thus platform 20 and lid 30 are shaped and sized such that when the unit has been installed in a vehicle in which back wall 13 and rear side 15 of seat construction 16 are both sloped upwardly and inwardly relative to cargo-receiving area 12 or in which walls 11, 13 and the rear side 15 are all sloped upwardly and inwardly relative to area 12, and in either case when the lid and the vehicular back door or tailgate 14 are closed, the lid—even without a latch or lock—cannot be raised and the unit as a whole cannot be tilted to gain access to items in the storage compartments. Only upon opening the back door or tailgate 14 can the lid be raised or, if desired, the unit removed from the vehicle. Thus the unit thwarts rapid thie-very of items located in the storage compartments, thievery which ordinarily is possible merely by smashing a rear car window and reaching in for items in the rear cargo area. This feature of the invention is made possible because the outer limits of the platform and lid either abut or are sufficiently close to the surrounding interior of the vehicle so that the unit as a whole cannot be tilted to reach underneath the platform, and the lid cannot be raised when the back door or tailgate is closed. Furthermore, the unit is removably secured in position without requiring attachment to the vehicle. This in turn means that if the full height of the cargo-receiving space is needed for accommodating large sized cargo, the unit can easily be removed from the vehicle.

Figure 16:
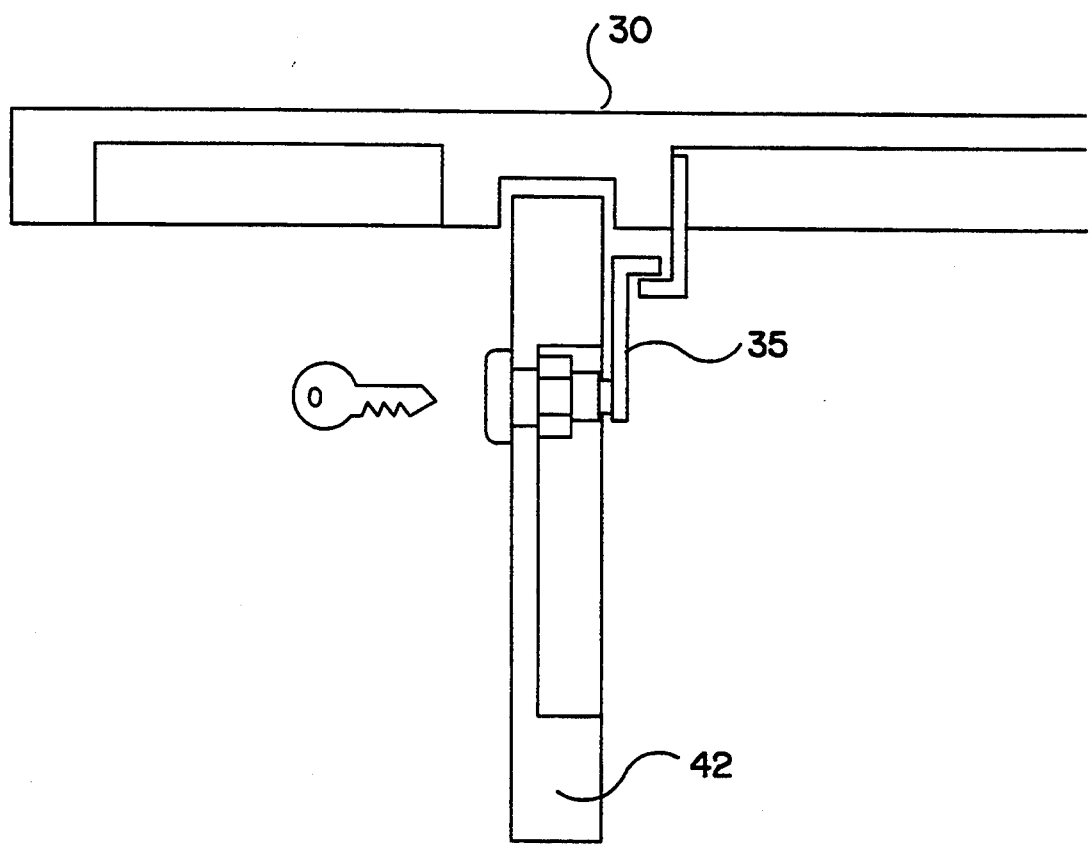
FIG. 16 is a fragmentary side elevation partly in section illustrating one preferred arrangement for latching or locking the lid or trap door to a back wall segment of the wall portion.
Figure 17:
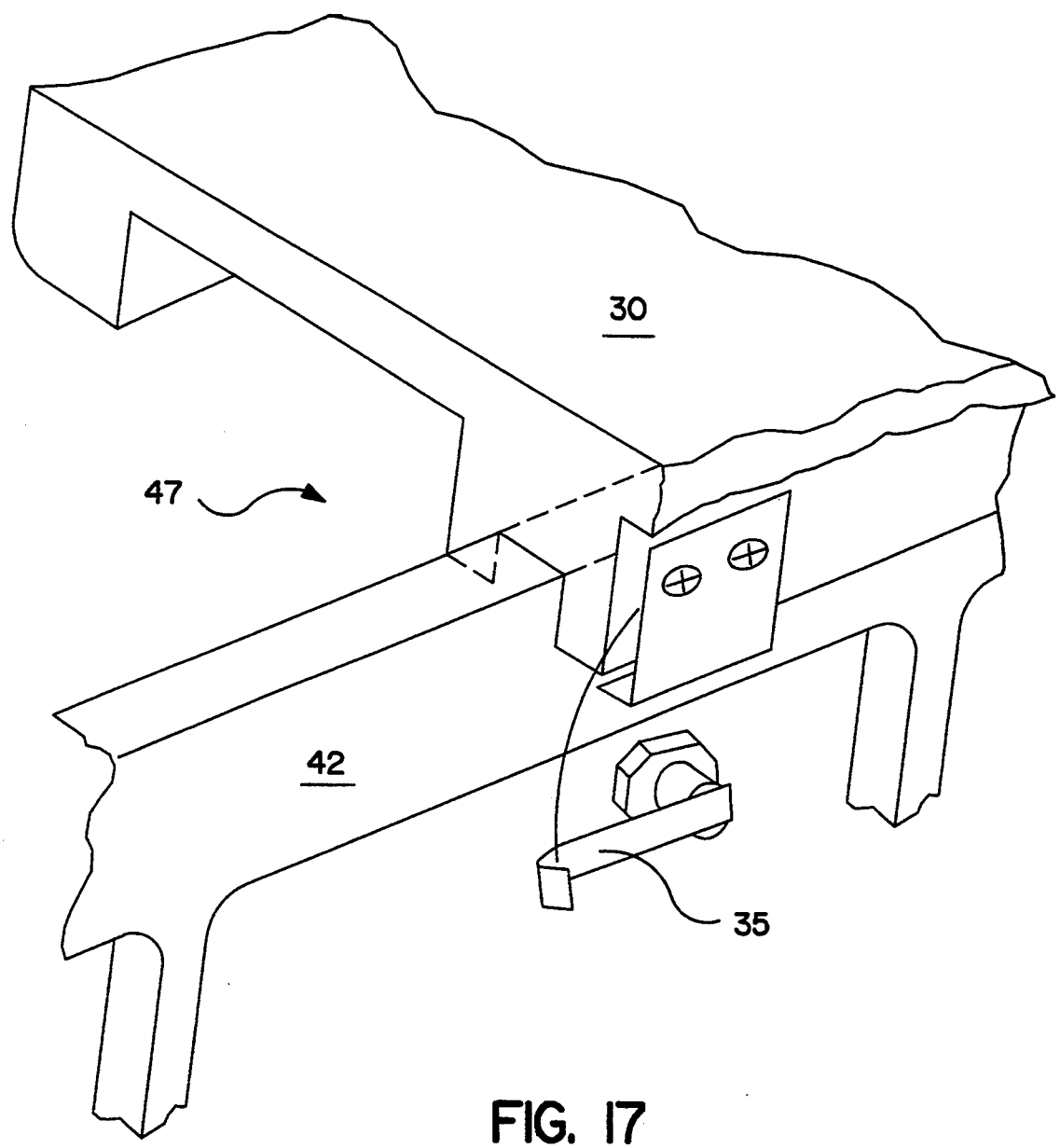
FIG. 17 is an enlarged fragmentary view in perspective of the interior side of the latching or locking arrangement of FIG. 16.

In a preferred embodiment at least one lock or latch mechanism 35 is disposed under lid 30 so that the lid can be locked or latched in closed position. This mechanism can be of any suitable type (e.g., hook and eyelet, spring bolt, sliding latch, latch and padlock, etc.), and preferably is located so that the mechanism establishes a linkage or connection to a back part of wall portion 40 such as wall segment 42. Note in this connection FIGS. 16 and 17. Because mechanism 35 is disposed under lid 30 it is concealed from view when the back door or tailgate 14 is closed and thus helps disguise the fact that valuable items may be located beneath the platform. Moreover to gain access to mechanism 35 it is necessary to open the back door or tailgate because of the fact that the closed lid extends very close to and preferably abuts interior vehicular wall 13 of the back door or tailgate. Thus by causing wall segment 42 to be retracted from the back outer edge of the platform and lid, not only is rear compartment 47 created but in addition, still greater security is made possible through disposition and concealment of a lock or latch mechanism 35 under the overhang which exists when the lid is closed.

If the unit is to be installed in a vehicle in which only its two interior side walls 11,11 are sloped upwardly and inwardly relative to area 12, it is preferable to use a unit equipped with at least one lock or latch mechanism 35 disposed under lid 30 in the manner described above so that the lid cannot be raised unless the back door or tailgate 14 is opened and the lock or latch mechanism is unlocked or unlatched.

In one of its preferred forms, the unit is configured such that each storage compartment is accessible upon opening the lid, except for a front compartment extending transversely between wall segment 41 and the rear side 15 of the back rest of seat construction 16, such as front compartment 46. Such front compartment accessible only by lowering the back rest of the proximate seat. Each of the storage compartments schematically illustrated in FIG. 12 is thus secure against rapid unwanted access as by a thief, yet is readily accessible to the user of the unit.

Although the unit can be of any suitable height, it is preferred to provide and utilize a unit having a low profile—e.g., a height in the range of about 6 to about 10 inches and with the height of the storage compartments in the range of about 5 to about 9 inches as this helps conceal the existence of the unit in the vehicle. And yet, this height is quite satisfactory for storing a great variety of items, such as jumper cables, tow strap, first aid kit, road flares, flashlight, rain gear, work boots and other articles normally carried in these vehicles. At the same time there is also ample room for small packages from shopping, purses, cameras, binoculars, and other valuables, all of which can be carried out of sight and with increased safety and security.

There are still additional advantages of providing a low-profile unit dimensioned as just described. One such advantage is that in the case of some vehicles in which the jack compartment is located in one interior side of the vehicle, such compartment remains accessible even after the unit has been installed. Further, in the case of some vehicles having pull-out shade of nylon or like fabric to cover cargo, the shade remains accessible and available for use with the unit in place, should such use be desired.

The unit provides still another functional advantage in that it serves as an elevated platform for carrying larger sized articles such as large packages from shopping, large boxed or crated objects, a lawn mower, a child's wagon or tricycle, etc. Thus the unit is ergonomically advantageous as it serves as an elevated platform onto which heavier articles can be placed and from which such articles can be removed with less back strain because of the more desirable elevation above ground level that the unit provides.

Figure 6:
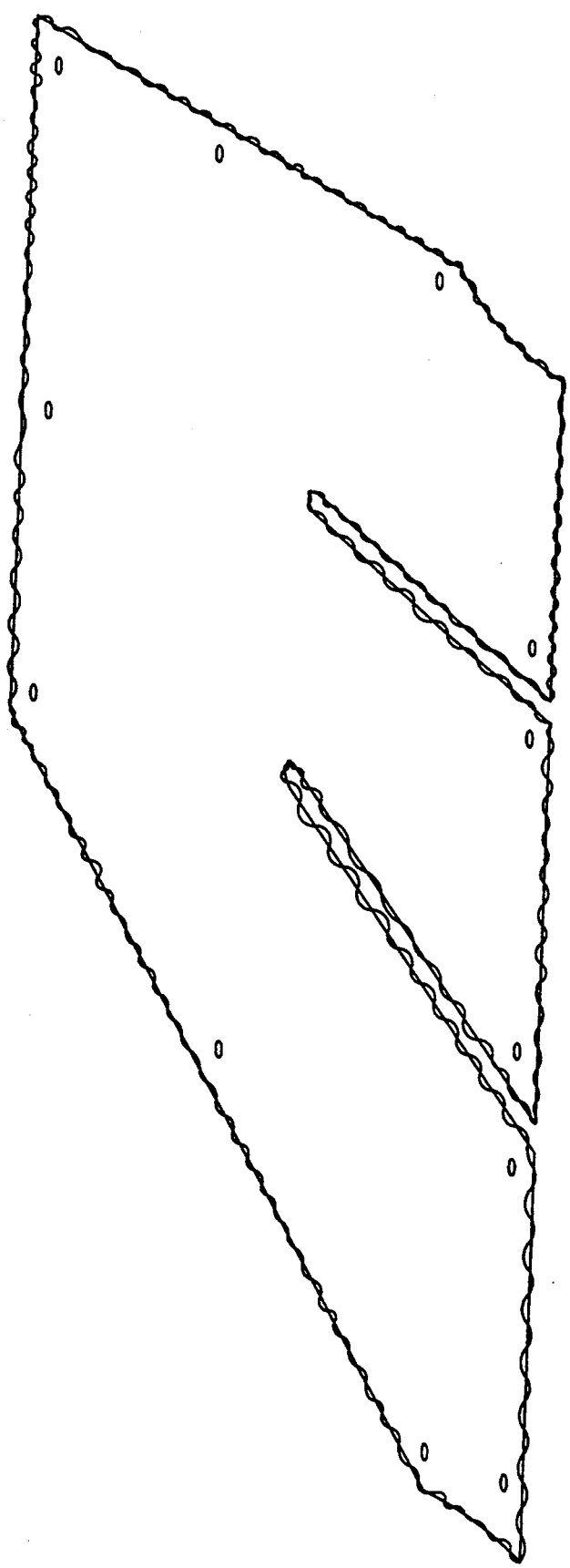
FIG. 6 is a view in perspective of a carpet covering for a unit.
Figure 9:
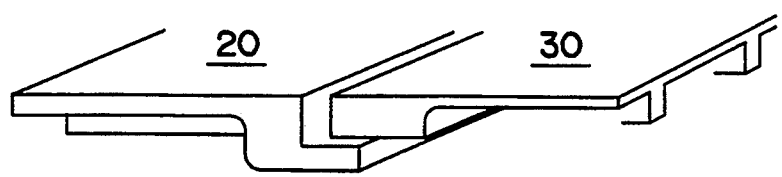
FIG. 9 is a fragmentary view in perspective of a portion of a unit and the lid thereof and illustrating one preferred type of construction arrangement for supporting the lid while in closed position.
Figure 10:
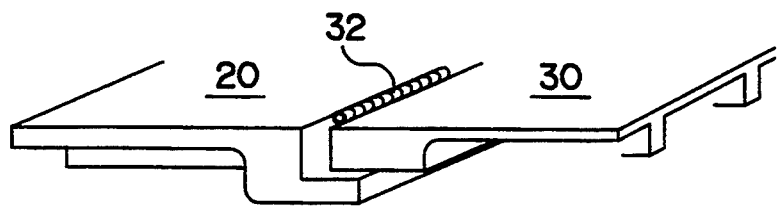
FIG. 10 is a fragmentary view in perspective of a portion of a unit and the lid thereof and illustrating one preferred type of construction arrangement for hinging the lid thereof to the unit.

In another preferred embodiment the tops of both the platform and the lid are camouflaged so as render it less likely that a passer-by will perceive the existence of the unit in the parked vehicle. While various methods of effecting a camouflage effect may be used, one especially preferred way is to cover the tops of the platform and lid with carpeting of the same general color and texture of carpeting used in the vehicle (note FIG. 6).

This carpeting can be affixed in place by any suitable method such as by use of adhesive, carpet pins, or the like. Carpeting offers the advantage of providing good concealment for the two slits (again note FIG. 6) needed to permit raising and lowering of the lid. Another preferred way of effecting a camouflage effect is to affix to the tops of the platform and lid a continuous thin covering of material that matches in appearance the normal surface of the cargo-receiving area, again with the material slit to permit the lid to be raised and lowered.

Figure 1:
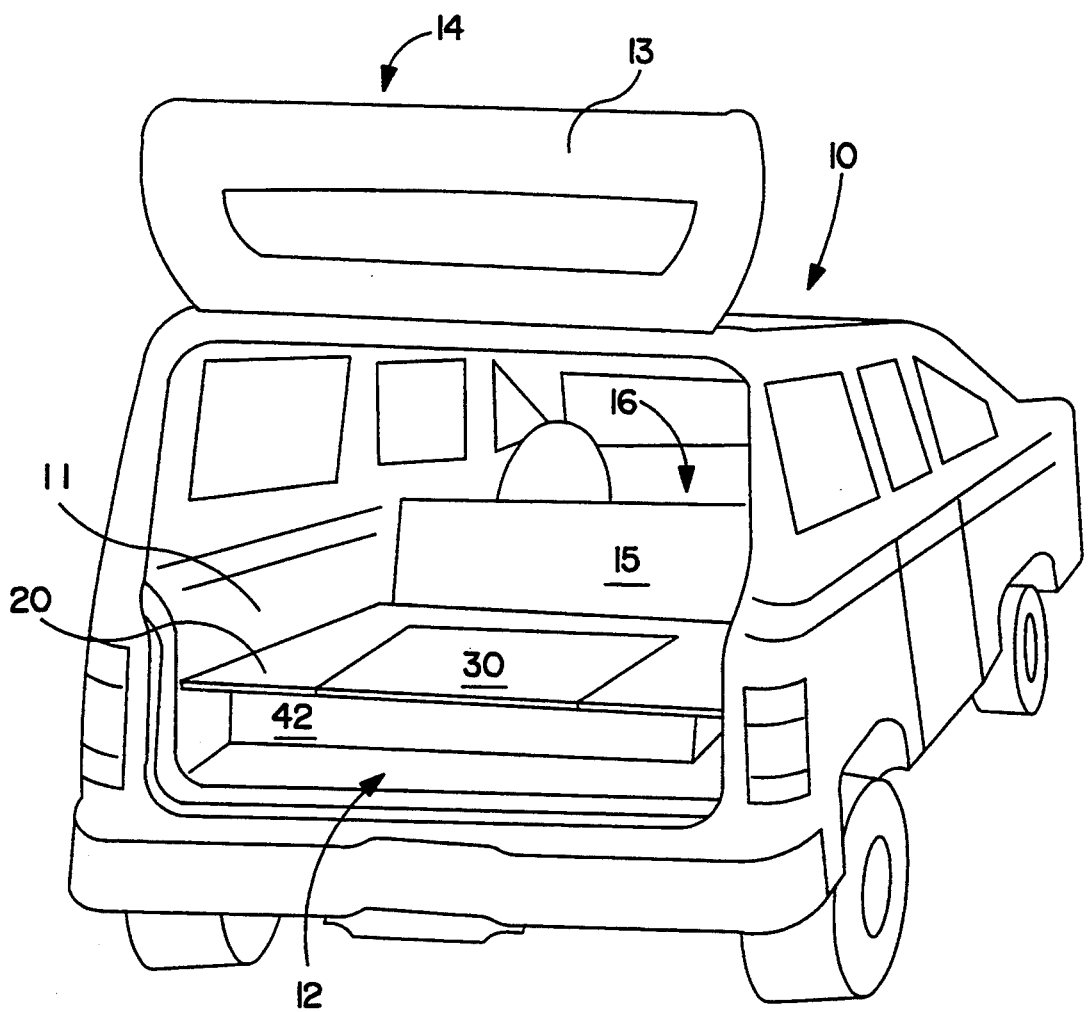
FIG. 1 is a view in perspective of a utility vehicle with its back door open and with a unit disposed therein with the lid thereof in closed position.
Figure 2:
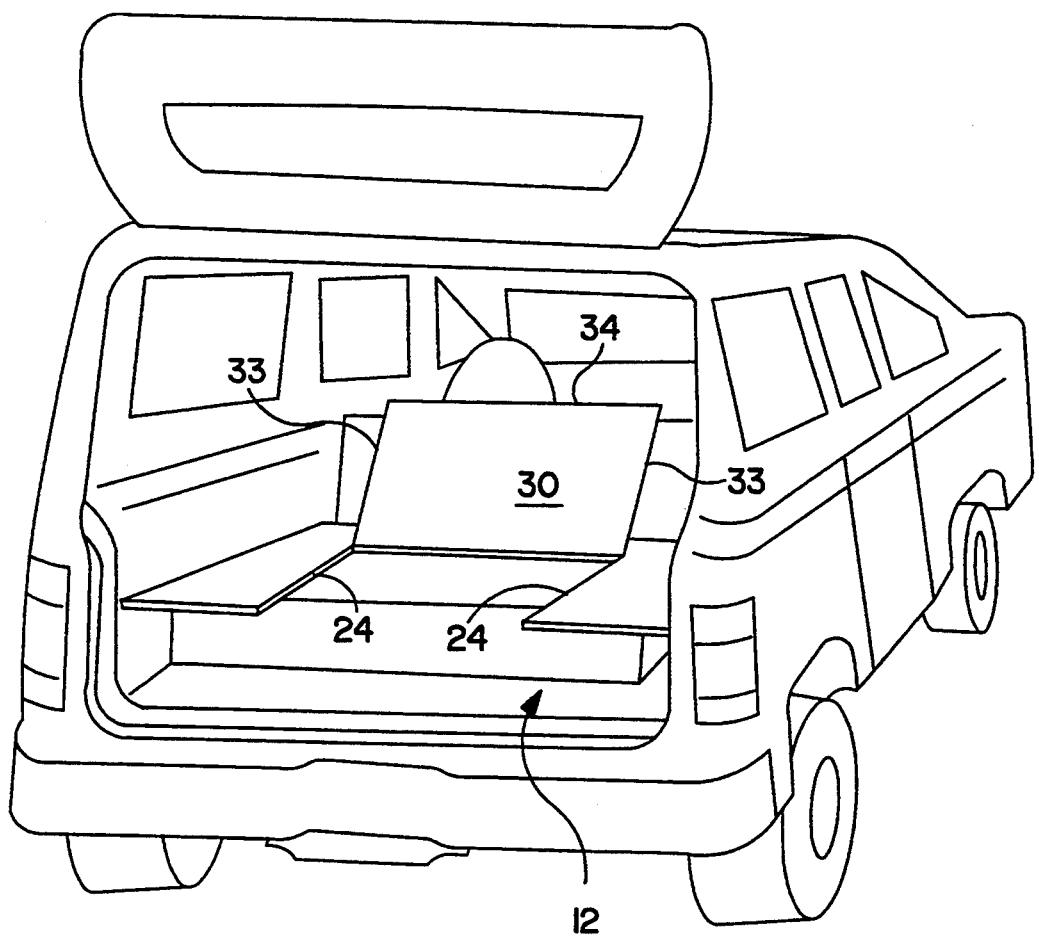
FIG. 2 is the same as FIG. 1 but with the lid of the unit in an open position.
Figure 3:
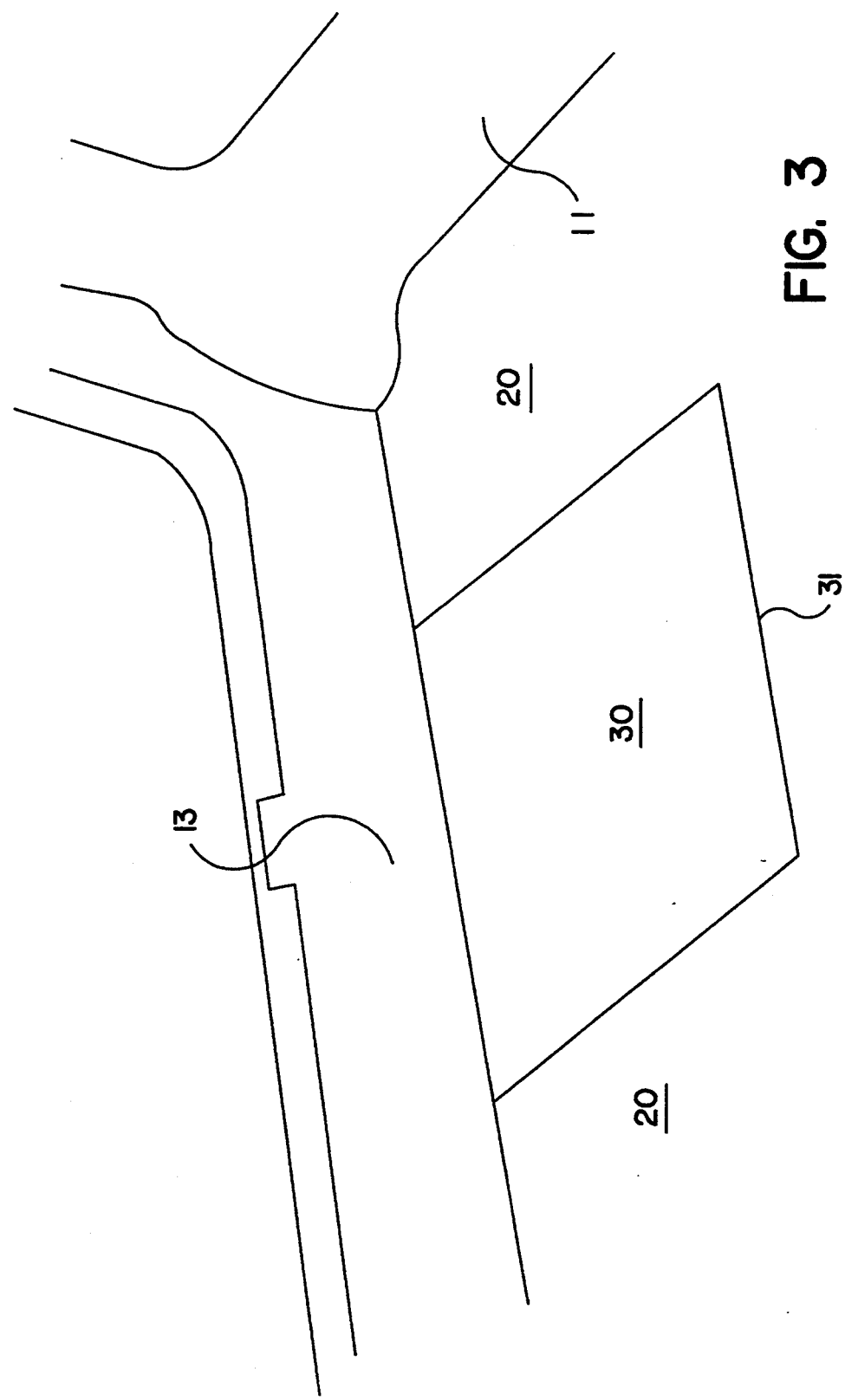
FIG. 3 is a fragmentary view in perspective of a portion of the back, side and corner interior of a utility vehicle and a portion of a unit installed therein with the lid thereof in closed position.

As illustrated for example by FIGS. 3 and 5, the outer perimeter of the platform usually can be and preferably is configured to conform to the inner configuration of the vehicle in which the unit is to be employed and at the height at which the platform will be held above the floor of the cargo-receiving area by the wall portion. Preferably, such conformation will be as close as can be arranged without at the same time rendering it difficult to install and remove the unit from the particular vehicle.

Figure 13A:
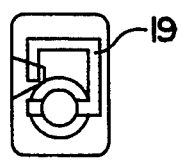
FIGS. 13A and 13B illustrate in plan view fold-down cargo net hooks used in certain utility vehicle models.
Figure 13B:
Figure 14:
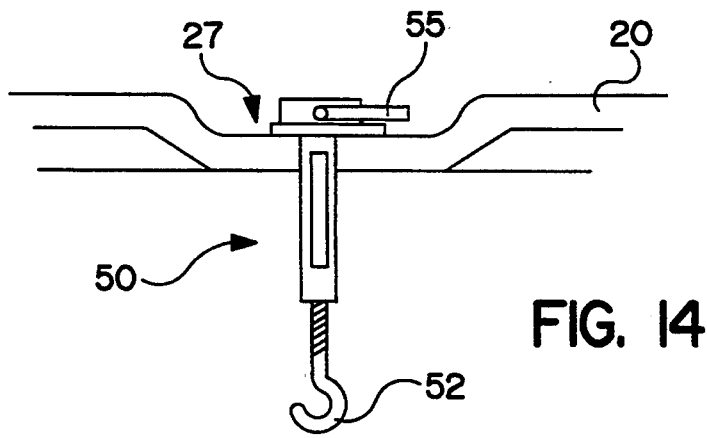
FIG. 14 is a fragmentary section of an apertured recess in the platform of a unit and showing in side elevation an adjustable fastener inserted therein.

Some vehicles currently use a cargo net to secure items in the cargo area. These vehicles have recessed fold-down hooks 19 (note FIGS. 13A and 13B) in the cargo floor area. Fasteners such as illustrated in FIG. 14 can be used to advantage in these vehicles. These fasteners are composed of a turnbuckle 50 fitted at its lower end with hook 52 and at its upper end with a fold-down hook 55 similar or identical in configuration to hook 19. So as not to interfere with the overall flat top surface of the unit, an apertured recess 27 for each respective fastener is provided in the top of platform 20 and these recesses are located so as to be directly over each hook 19 in the vehicle floor when the unit is in place in the vehicle. These fasteners in effect are adjustable extensions of hooks 19 already present in the vehicle. Thus when the fastener is installed as depicted and its hook 52 is engaged with its respective hook 19 and is rotatably tightened, hook 55 can be used in the same way as hook 19 for fastening the cargo net in place. It will be seen that this construction, whether or not used with a net, detachably secures the unit in place. In addition, this construction further adds to the camouflage effect that disguises the presence of the unit in the vehicle.

The unit can include a floor section (not shown) should this be desired. However in most cases it is unnecessary to include a floor section as the floor of the cargo-receiving area of the vehicle serves the purpose just as well.

Figure 11:
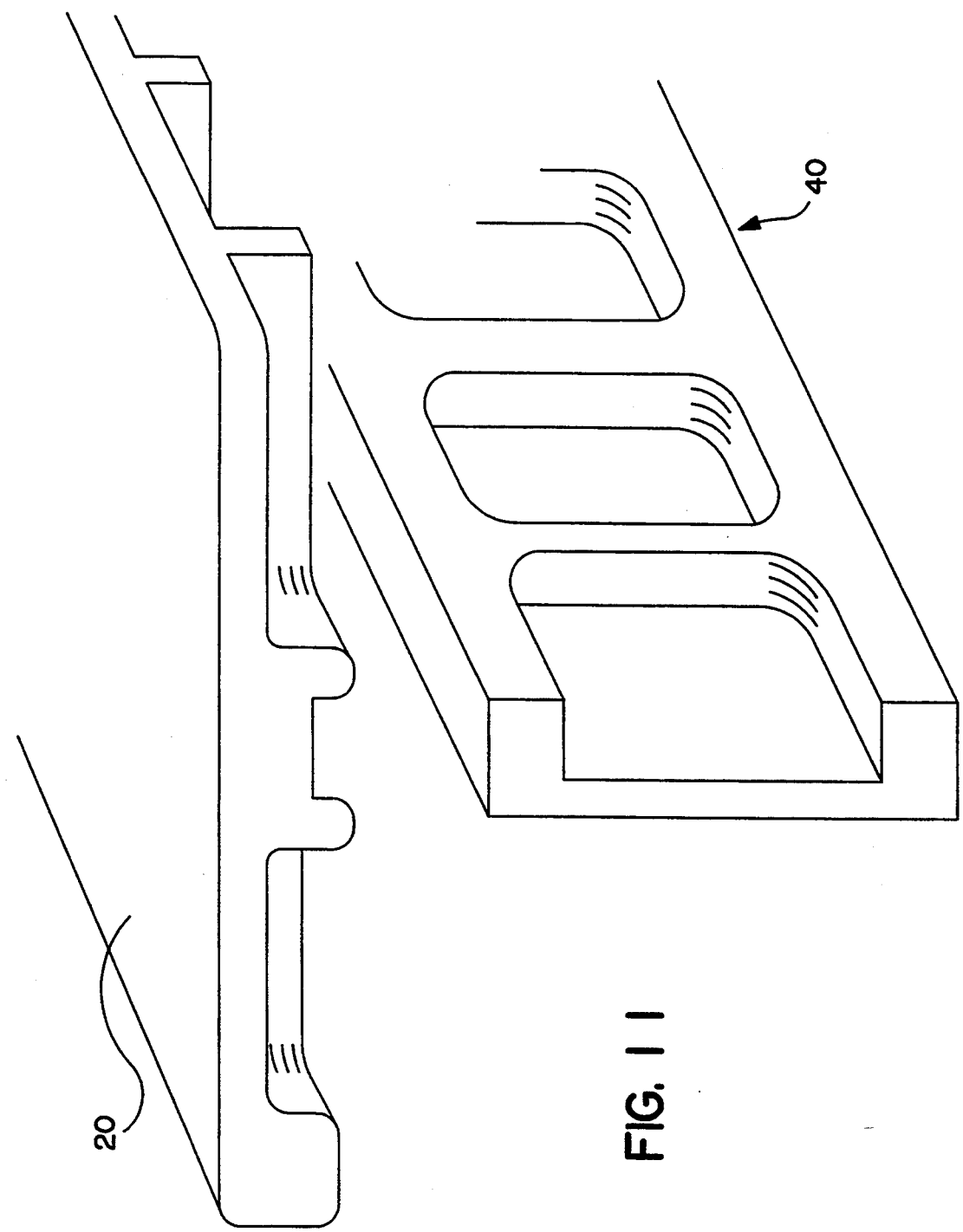
FIG. 11 is an exploded fragmentary view in perspective of a portion of a unit illustrating one preferred type of construction arrangement for joining the platform with the supportive wall portions during assembly of the unit.

The unit can be fabricated from any suitable material by any appropriate method of fabrication. For example, the units can be fabricated from wood or suitable light weight metal, plastic or composite materials having appropriate structural strength. One very suitable construction material is ABS especially when molded in ribbed form. FIG. 11 illustrates one of the numerous ways in which separate wall portions and platforms can be joined together, and once joined the parts can be bonded together with adhesives or by means of staples, nails, screws or other conventional fasteners. Alternatively, the unit may be molded as an integral unit so that only the lid would be separately attached by means of one or more hinges 32. Still another alternative is to provide wall portion 40 as one separate part, and platform 20 with lid 30 hinged thereto as another separate part whereby installation is effected by placing the wall portion in a suitable desired position on the floor of the cargo-receiving area, and then placing or detachablyattaching the platform and hinged lid in proper position thereon.

It should be apparent from the above description and accompanying Drawings that the units of this invention possess and can provide a number of advantages and beneficial features. Some of these are as follows:

a) Easily accessible storage compartments are provided.

b) Because of the low profile of the unit and close conformity between the top of the unit and the space in which the unit is installed, the unit does not significantly affect the utility of the conventional cargo-receiving space in the vehicle.

c) Because of the low profile, camouflage effect if used and close conformity between the top of the unit and the space in which the unit is installed, the fact that the unit is in place is not readily apparent.

d) Since items stored in the compartments are out of sight, likelihood of theft is reduced.

e) Since access to the stored items in a parked and locked vehicle for the purpose of theft requires much more than merely reaching through a smashed window to remove the items, likelihood of theft is reduced.

f) In sudden stops unsecured items in a vehicle can become flying objects, whereas the unit enables items to be stored safely and securely, thus contributing to the safety of the occupants of the vehicle.

g) The unit enhances the utility of the cargo space in the vehicle by enabling many items to be carried at a lower level, and larger or bulky items to be carried at an upper level.

h) Because of its low profile, the unit serves as a raised platform of a height that reduces back strain when placing heavy objects onto the top of the unit and when removing such objects from the vehicle.

i) The unit can be made from strong, light weight materials and thereby serve its functions without adversely affecting the handling or operating efficiency of the vehicle.

j) The unit is easy to install and remove since in vehicles with cargo spaces of conventional design, the unit can be slipped in place or removed in a matter of seconds.

k) Because of its low profile the unit while in place enables long items (lumber, piping, etc.) to be carried in vehicles equipped with a seat that folds down forward of the normal cargo space.

l) In vehicles equipped with hooks for fastening cargo nets over cargo in the utility space, the unit can be designed and equipped to enable the unit to be detachably attached to the vehicle by making use of such hooks even though they are covered by the unit, and to enable the cargo nets to be used, if desired.

m) The unit does not prevent access to the spare tire or jack, no matter where these are located, since even in cases where the unit covers the storage areas of these items, the unit can be easily removed in a matter of seconds.

n) A plurality of storage compartments are provided, and these can be of different shapes so that long articles such as umbrellas, clothes hanging bars, long-handled ice-scrapers, fishing rods, golf clubs, baseball bats, hockey sticks, etc. can be stored in elongated storage compartments while smaller items can be carried in a storage compartment of lesser length and width.

o) Items in a forward storage compartment can be accessed from inside the vehicle simply by folding down a seat back rest, and thus the occupants need not exit the vehicle to open the back door or tailgate to gain access to such items.

p) The unit is not permanently attached to the vehicle and thus no alteration of vehicle design and manufacture is required and no permanent damage to the vehicular interior such as holes for screws or bolts is required.

q) The unit is configured to cooperate with and take full advantage of the interior configuration of the vehicle storage space to make available all of the foregoing advantages and beneficial features while at the same time requiring no alteration of any kind in the vehicle itself.

This invention is susceptible to considerable variation in its practice. Therefore the foregoing description is not intended to limit, and should not be construed as limiting, the invention to the particular forms of the invention described with reference to the Drawings. Rather, what is intended to be covered is as set forth in the ensuing claims and the equivalents thereof permitted as a matter of law.

I claim:

1. A free-standing compartmentalizer unit adapted for easy installation in and easy removal from an automotive vehicle that has (a) a generally flat cargo-receiving area having a perimeter (b) a front seat construction having at least one back rest with a rear side, (c) spaced-apart interior vehicular side walls, and (d) a back door or tailgate having an interior vehicular wall, said perimeter being defined by (i) said side walls, (ii) said interior vehicular wall, and (iii) said rear side; and wherein at least the walls of (i) or at least the walls of (ii) and (iii) are sloped upwardly and inwardly relative to the cargo-receiving area, wherein A) the unit comprises (1) a platform, (2) a hinged lid; and (3) a supportive wall portion;

B) the platform has (1) an upper surface falling in a generally flat plane, (2) a forward edge portion, (3) a pair of spaced-apart outside edge portions, (4) a pair of laterally spaced-apart rearward edge portions, and (5) a cutaway space extending forwardly between the spaced-apart rearward edge portions and terminating at an interiorly-disposed transverse back edge;

C) the cutaway space in the platform is defined by a pair of forwardly-extending inside edges of the platform and the interiorly-disposed transverse back edge of the platform;

D) the lid has (1) a front edge, (2) a back edge, (3) a pair of spaced-apart side edges, (4) a bottom surface, and (5) a top surface;

E) the lid is sized and shaped to fit within and substantially fill the cutaway space, and is hinged to the platform either (1) between the front edge of the lid and the interiorly-disposed transverse back edge of the platform or (2) between one of the side edges of the lid and the one of the forwardly-extending inside edges of the platform that is proximate thereto, so that in either case the lid can be raised to an open position by pivotal movement upwardly from, and can be lowered to a closed position by pivotal movement downwardly to a position in which the top surface of the lid is co-planar with the upper surface of the platform;

F) said pair of laterally spaced-apart rearward edge portions of the platform and the back edge of the lid form a substantially continuous back edge portion when the lid is disposed in the said closed position;

G) said wall portion is sized, shaped and adapted to support the platform a predetermined distance above the cargo area and provide therein a plurality of storage compartments when the compartmentalizer unit is installed in the vehicle with the wall portion below the platform;

H) the platform and lid are shaped and sized such that when the platform is supported at the predetermined distance above the cargo area floor with the lid disposed in the closed position, the platform and lid define an outer perimeter in which (1) one of the spaced-apart side edge portions of the platform generally conforms to and closely confronts or abuts one of the spaced-apart interior vehicular side walls and the other of the spaced-apart side edge portions of the platform generally conforms to and closely confronts or abuts the other of the spaced-apart interior vehicular side walls, (2) the forward edge portion of the platform generally conforms to and closely confronts or abuts the rear side of the seat construction, and (3) the continuous back edge portion generally conforms to and closely confronts or abuts the interior vehicular back door or tailgate wall whereby the compartmentalizer unit is removably secured in position without requiring attachment to the vehicle.

2. A unit in accordance with claim 1 wherein said wall portion includes a segment that is recessed from said substantially continuous back edge portion thereby providing a lid overhang while the lid is in closed position.

3. A unit in accordance with claim 2 wherein said unit further comprises locking or latching means for establishing and maintaining detachable attachment between said wall segment and the lid when in closed position, said means being covered by said lid overhang.

4. A unit in accordance with claim 1 wherein said wall portion is recessed from said outer perimeter thereby providing a lid overhang while the lid is in closed position.

5. A unit in accordance with claim 1 wherein the lid is hinged to the platform between or along the front edge of the lid and said interiorly-disposed transverse back edge of the platform, and wherein said wall portion is recessed from said outer perimeter thereby providing a lid overhang while the lid is in closed position.

6. A unit in accordance with claim 5 wherein said unit further comprises locking or latching means for establishing and maintaining detachable attachment between said wall portion and the lid when in closed position, said means being covered by said lid overhang.

7. A unit in accordance with claim 6 wherein a part of said wall portion is disposed under and traverses said cutaway space so that the lid while in closed position is supported by said part of the wall portion; wherein the unit has a low profile; and wherein the top surfaces of the platform and lid are camouflaged to disguise the presence of the unit when installed in a vehicle.

8. A unit in accordance with claim 5 wherein said unit further comprises locking or latching means for establishing and maintaining detachable attachment between said wall portion and the lid when in closed position, said means being covered by said lid overhang; wherein the unit has a low profile; and wherein the top surfaces of the platform and lid are camouflaged to disguise the presence of the unit when installed in a vehicle.

9. A unit in accordance with claim 8 wherein the top surfaces of the platform and lid are camouflaged with carpeting.

10. A unit in accordance with claim 1 wherein a part of said wall portion is disposed under and traverses said cutaway space so that the lid while in closed position is supported by said part of the wall portion.

11. A unit in accordance with claim 1 wherein the unit has a low profile and wherein the top surfaces of the platform and lid are camouflaged to disguise the presence of the unit when installed in a vehicle.

12. A free-standing compartmentalizer unit adapted for easy installation in and easy removal from an automotive vehicle that has a generally flat cargo-receiving area having a perimeter and a back door or tailgate portion, said unit comprising (i) a platform including a hinged trap door portion and (ii) an underlying supportive wall portion, said platform and hinged trap door portion both having a camouflaged top surface, and said unit being configured and sized such that when installed within said vehicle:

a) the unit has a low profile;

b) the platform and closed trap door (i) have an outer perimeter that substantially conforms to the perimeter of said cargo-receiving area and (ii) provide a substantially continuous flat camouflaged top surface over substantially the entire cargo-receiving area;

c) the unit defines a plurality of storage compartments beneath said platform;

d) the trap door provides access to a plurality of said storage compartments; and e) the trap door is disposed such that a free edge thereof abuts or closely confronts the back door or tailgate portion of the vehicle when the trap door is in closed position.

13. A unit in accordance with claim 12 wherein the camouflaged top surface of said platform and hinged trap door portion comprises carpeting.

14. A unit in accordance with claim 12 wherein said wall portion is recessed from said outer perimeter thereby providing a trap door overhang while the trap door is in closed position.

15. A unit in accordance with claim 14 wherein said unit further comprises locking or latching means for establishing and maintaining detachable attachment between said wall portion and the trap door when in closed position, said means being covered by said trap door overhang.

16. A unit in accordance with claim 12 wherein a part of said wall portion is disposed under and provides support to the trap door while in closed position.

17. A unit in accordance with claim 12 wherein the camouflaged top surface of said platform and hinged trap door portion comprises carpeting, and wherein the trap door is disposed such that a free edge thereof abuts the back door or tailgate portion of the vehicle when said unit is installed within said vehicle and the trap door is in closed position.

18. A unit in accordance with claim 17 wherein a part of said wall portion is disposed under and provides support to the trap door while in closed position.

19. A unit in accordance with claim 12 wherein the camouflaged top surface of said platform and hinged trap door portion comprises carpeting; wherein said wall portion is recessed from said outer perimeter thereby providing a trap door overhang while the trap door is in closed position; wherein said trap door provides access to a plurality of said storage compartments, and wherein said unit further comprises locking or latching means for establishing and maintaining detachable attachment between said wall portion and the trap door when in closed position, said means being covered by said trap door overhang.

20. A unit in accordance with claim 12 wherein said unit further comprises locking or latching means for establishing and maintaining detachable attachment between said wall portion and the trap door when in closed position.

* * * * *